United States Patent
Harper et al.

(10) Patent No.: US 9,477,522 B2
(45) Date of Patent: Oct. 25, 2016

(54) SYSTEM AND METHOD FOR IMPLEMENTING WORKFLOW MANAGEMENT USING MESSAGING

(71) Applicant: Tuul, Inc., Alameda, CA (US)

(72) Inventors: Tom Harper, Orinda, CA (US); Toby Corey, Santa Cruz, CA (US); Wayne Tsuchitani, Santa Cruz, CA (US)

(73) Assignee: TUUL, INC., Alameda, CA (US)

( * ) Notice: Subject to any disclaimer, the term of this patent is extended or adjusted under 35 U.S.C. 154(b) by 9 days.

(21) Appl. No.: 14/321,671

(22) Filed: Jul. 1, 2014

(65) Prior Publication Data

US 2016/0004565 A1 Jan. 7, 2016

(51) Int. Cl.
*G06F 9/46* (2006.01)
*G06F 9/48* (2006.01)
*G06F 9/54* (2006.01)
*G06F 3/0484* (2013.01)

(52) U.S. Cl.
CPC ......... *G06F 9/4881* (2013.01); *G06F 3/04842* (2013.01); *G06F 9/546* (2013.01); *G06F 9/4843* (2013.01)

(58) Field of Classification Search
CPC .................................................. G06F 9/4843
USPC .......................................................... 718/102
See application file for complete search history.

(56) References Cited

U.S. PATENT DOCUMENTS

| | | | |
|---|---|---|---|
| 6,574,675 B1 | 6/2003 | Swenson | |
| RE38,633 E | 10/2004 | Srinivasan | |
| 7,657,636 B2 | 2/2010 | Brown et al. | |
| 8,219,648 B2 | 7/2012 | Trossman et al. | |
| 8,386,288 B2 * | 2/2013 | Ananian | G06F 9/5038 705/7.13 |
| 8,468,529 B2 | 6/2013 | Mohanty et al. | |
| 2001/0039594 A1 * | 11/2001 | Park | G06F 8/20 719/311 |
| 2006/0155713 A1 * | 7/2006 | Singh | G06Q 10/06 |
| 2010/0122266 A1 | 5/2010 | Dufosse et al. | |
| 2012/0011239 A1 | 1/2012 | Svane et al. | |
| 2013/0227285 A1 * | 8/2013 | Bracher | G06F 21/62 713/168 |
| 2014/0244329 A1 | 8/2014 | Urban | |
| 2014/0259113 A1 | 9/2014 | Harris et al. | |

* cited by examiner

*Primary Examiner* — Wei Zhen
*Assistant Examiner* — Lanny Ung
(74) *Attorney, Agent, or Firm* — David R. Stevens; Stevens Law Group

(57) ABSTRACT

A system provides workflow management functions over a messaging or data protocol. A workflow management object defining functions and values and events for sending and receiving workflow management data is defined on a first device and transmitted to a second device. On the second device the workflow is rendered for interaction and response, and an interaction with the workflow object is captured. A captured or generated response is transmitted back to the first device or intermediary system via the messaging protocol. The response to the workflow object (e.g. an event) may be used by the device or intermediary systems to update a status of a workflow such as hosted by a remote server system. Events detected by a workflow system may invoke processing of subsequent workflow objects in a chain such that a complex workflow may be processed over the messaging protocol.

20 Claims, 10 Drawing Sheets

SYSTEM AND METHOD FOR IMPLEMENTING WORKFLOW MANAGEMENT USING MESSAGING

BACKGROUND

1. Field of the Invention

This invention relates to systems and methods for managing workflow.

2. Background of the Invention

The present invention relates generally to workflow management tools. Workflow management or project management software enables users to specify tasks, ordering of tasks, define reminders for the completion of tasks, and take other actions to record progress of a project and plan activities needed to complete a project. However, these tools are desktop based and are ill suited for remote workers in the field and other distributed work forces.

The capabilities of mobile phones have increased significantly and many may have the capacity to operate task management tools but are unsuitable due to their small screen size and limited battery life. Mobile phones do advantageously enable rapid communication among remote workers by means of various OTT (over the top) data messaging services such as Skype, messaging protocols such as XMPP, and mobile messaging protocols and services such as short message service (SMS), multimedia message service (MMS), and enhanced message service (EMS) messaging. However, the limited capabilities of the interfaces for these channels are not readily used for workflow management functions. Other messaging protocols exist for exchanging messages between desktop or laptop computers, such as email and various instant messaging protocols. These likewise provided limited capacity for managing workflow management functions.

The systems and methods disclosed herein provide an improved approach for performing workflow management using messaging protocols for both mobile and other computing devices.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
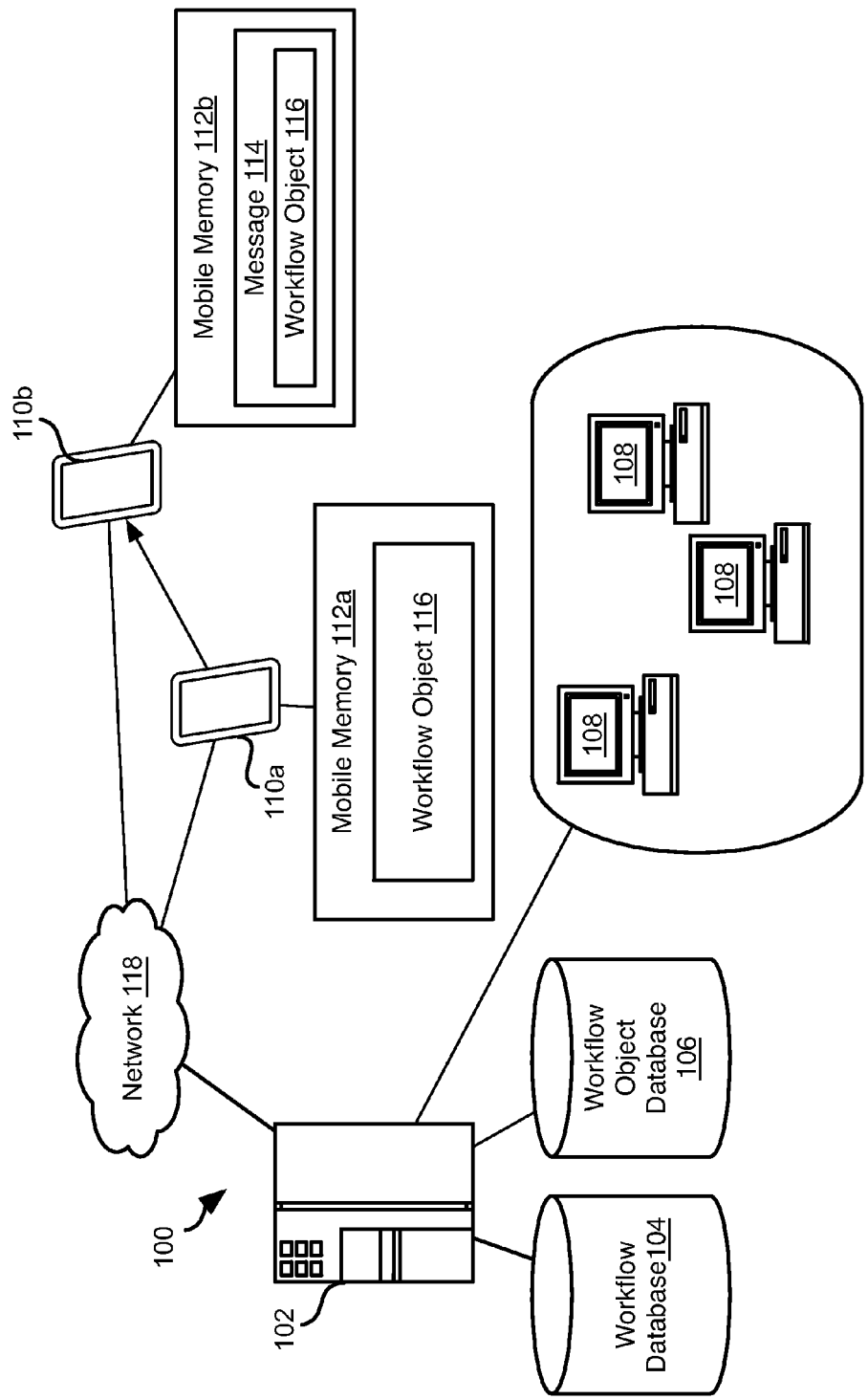
FIG. 1 is a schematic block diagram of a network environment suitable for implementing methods in accordance with embodiments of the invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods.

A workflow is just a repeatable sequence of ordered operations resulting in some coordinated activity of services, information, materials and people. Workflow is in conflict to some extent with language itself—it is the nature of verbal and text communication in spoken languages that most statements made by any two different people will not be repeatable and exact, or be able to be interpreted in a singular manner. Workflow needs to be repeatable, and so we need to step beyond language as the medium by which workflow is delivered.

A workflow as contemplated in this application may be similar to and an element of business process management, representing the processes of an enterprise so that the current process may be analyzed and improved. Flow charts have existed since the early 1900's and data flow diagrams are over 40 years old. The systems and methods disclosed herein provide an approach to performing a workflow in the course of a social and communications context. Workflows and processes can be shared, managed, used, and modified by those that are related by social connection and in the course of communications, whether professional or personal.

The advantages of the disclosed approach are multiple. For example, sharing of a workflow can imply assigning that workflow to a person, engaging that workflow from or for a person, or adding the person to a list of those contributing to the outputs of the workflow result. In other words, the communications of the workflow itself is a defining characteristic, which changes the resulting activities of the workflow.

Additionally, there is not current use of an approach wherein the communications of the workflow are viewed as a type of communication to the same extent as a picture, document, or audio or video media communication. Workflows in prior approaches are static processes, which may be used for sending data from one process step to the next, and the element of connection of the workflow as a social interaction and form of communication is novel.

The systems and methods disclosed herein provide a means of communication that encompasses multiple types of data (maps, time data, participants, etc.) and packages them together into a form where it can be interacted with by a remote party as part of a communication channel.

To add the needed level of precision to text communications for repeatable workflows, the systems and methods disclosed herein facilitate interaction over a text, voice, or data channel that results in the ability of a group or individual to provide precisely specified operations or options to another party and for the other party to precisely select one of the provided options. This capability is implemented using a workflow object or a "workflow widget". A "workflow widget" is a way to embed a precisely defined activity or workflow into a text or multimedia message stream, such that one can obtain a precise or desired response based on selecting a provided workflow option. The method of selection in a mobile or pc environment may be via gesture touch, mouse click, or typing. The precise response is obtained by the selection of an available option that is precisely defined. The form of the list may vary by design, in terms of providing a list of options, following standard User Interface (UI) practices (options lists, buttons, icons, text), supporting metadata describing the message contents, people involved, and possible actions on the workflow, such as accepting an option, requesting additional options, or rejecting the available options.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. Computer program code may also be written in a functional language such as Erlang. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, the systems and methods disclosed herein may be implemented using the illustrated network environment 100. A server system 102 may access a workflow database 104 storing data for a project and used by a workflow management tool executed by the server system 102. The server system 102 may include one or more processors and one or more separate computing devices that may be co-located or remote from one another.

The workflow management tool may implement any of the functionality of a workflow management or project management tool known in the art. For example, the workflow management tool may receive and store a list of a tasks and due dates for tasks as well as provide reminders for when tasks should be completed based on due dates. The workflow management tool may receive and store assignments of tasks to individuals or groups of individuals. The workflow management tool may receive and store a sequence of tasks such that when one task is recorded as complete the workflow management tool generates a notification to perform the next task in the sequence. The workflow management may provide an interface for users to update the statuses of tasks as well as provide information regarding the completion of tasks. Other workflow management and project management functions may also be implemented by the workflow management tool as known in the art.

In order to facilitate interfacing with the workflow management tool, the server system 102 may access a workflow object database 106. The workflow object database 106 may store definitions and instances of workflow objects shared among mobile devices in order to interface with the workflow management tool according to the methods described hereinbelow.

A user may interface with the workflow management tool by means of one or more workstation computers 108, e.g. desktop or laptop computers, providing a direct interface to the workflow management tool and enabling direct input of data and instructions to the workflow management tools.

One or more devices 110a, 110b may also interface with the workflow management tool using workflow objects as discussed hereinbelow. The devices 110a, 110b may be embodied as mobile devices, e.g. smart phones, tablets, wearable devices, or some other mobile device. Workflow objects may be generated by the server system 102, workstations 108, or on the devices 110a, 110b themselves. For purposes of illustration, the methods described herein are explained with reference to devices 110a, 110b, which are illustrated as mobile devices. However, the illustrated methods may be performed between devices 110a, 110b embodied as laptop or desktop computers or server computers providing an interface to one or more local or remote terminals. A device 110a may be used to define a workflow object and store it in the memory 112a of the device 110a. The workflow object may be transmitted to another device 110b in a message 114. The device 110b may then store the message 114 in its memory 112b and process the workflow. The message 114 may be a message according to any data transmission protocol such as IP (internet protocol) or some other messaging protocol (SMS, MMS, EMS, OTT data, voice, video, document exchange, cellular data transfer protocol, or some other form of communication) and may include or reference a workflow object 116 defined and processed according to the methods described below. In particular, workflow objects may be shared over a channel on top of any of these protocols or other data channel, e.g. an over-the-top (OTT) channel. The systems and methods described herein advantageously enable implementing one or more workflow functions in a structured, e.g. sequential, fashion over a peer-to-peer connection between two devices, which can then be used to influence or update a state of a workflow management tool.

The server system 102, workstations 108, and mobile devices 110a, 110b may communicate with one another over a network 114 such as the Internet, local area network (LAN), wide area network (WAN) or any other network topology. Communication may be over any wired or wireless connection. In particular, at least a portion of the path between mobile devices 110a, 110b and the server 102 may be a cellular wireless network.

Figure 2:
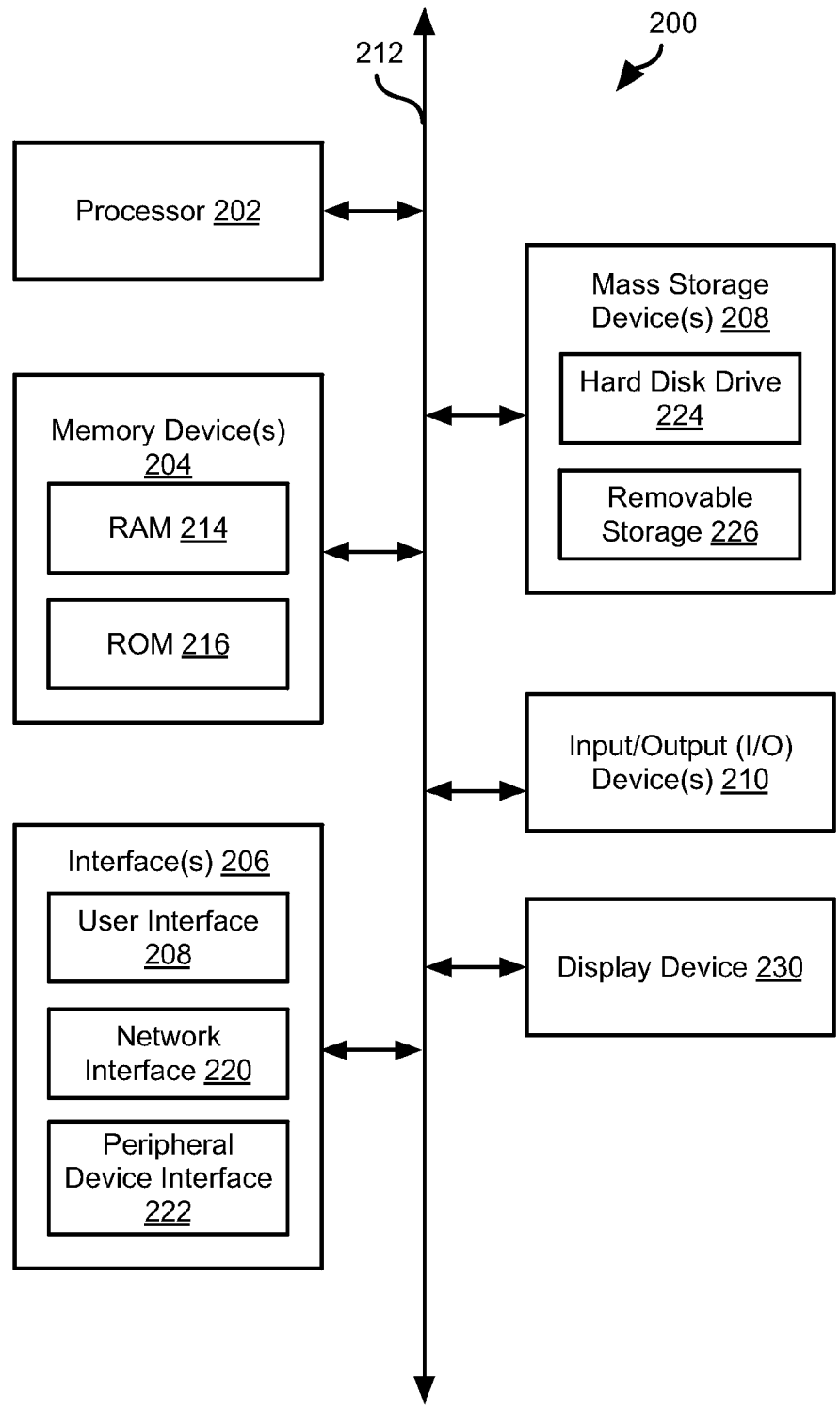
FIG. 2 is a schematic block diagram of a computer system suitable for implementing methods in accordance with an embodiment of the present invention.

FIG. 2 is a block diagram illustrating an example computing device 200. Computing device 200 may be used to perform various procedures, such as those discussed herein. A server system 102, workstation 108, and device 110a, 110b may have some or all of the attributes of the computing device 200. Computing device 200 can function as a server, a client, or any other computing entity. Computing device can perform various monitoring functions as discussed herein, and can execute one or more application programs, such as the application programs described herein. Computing device 200 can be any of a wide variety of computing devices, such as a desktop computer, a notebook computer, a server computer, a handheld computer, tablet computer and the like. A server system 102 may include one or more computing devices 200 each including one or more processors.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, printers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more user interface elements 218. The interface(s) 206 may also include one or more peripheral interfaces such as interfaces for printers, pointing devices (mice, track pad, etc.), keyboards, and the like.

Bus 212 allows processor(s) 202, memory device(s) 204, interface(s) 206, mass storage device(s) 208, and I/O device(s) 210 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
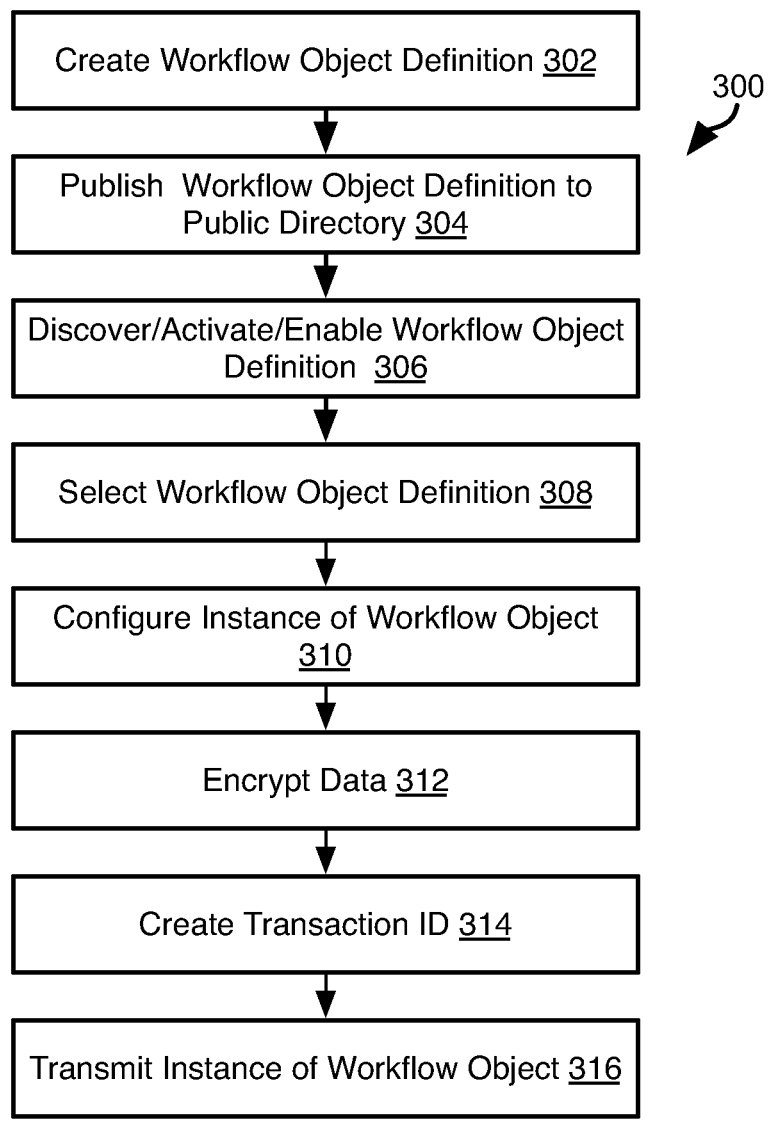
FIG. 3 is a process flow diagram of a method for generating workflow objects for transmission over a mobile messaging protocol in accordance with an embodiment of the present invention.

FIG. 3 illustrates an example method 300 for creating and transmitting a workflow object. The method 300 may include creating 302 a workflow object definition and publishing 304 the workflow object definition to a public directory, e.g. public to those authorized to access the system.

A workflow object (also referred to herein as "widget") definition may be an object definition that defines one or more data values and functions. The data values and functions of the workflow object may be those required to implement a workflow management function. For example, a workflow objects may be defined that include functions and values for implementing one or more of:

1. Routing a text conversation to a different representative on the company side
2. Responding to an appointment request with an alternate date choice, or replaying with a confirmed selection
3. Providing a list of appointment date/times, with map locations and participants
4. Sending an Appointment Time Reminder and Acceptance
5. Sending an Appointment Completed workflow
6. Selecting a rating from a list of possible ratings (1-5 stars for example)
7. Providing a digital signature for approval of an agreement
8. Providing a digital signature for sign off on a delivery or order of work
9. Setting of specific terms for a business arrangement and agreeing to amounts
10. Setting up a real time video conference meeting between several parties
11. Providing current balance and payment information
12. Taking a poll by selecting amongst the alternatives, and providing poll results
13. Providing a work estimate to be approved or reviewed by a customer
14. Proving a receipt for work performed with payment confirmation
15. Company Directory
16. Providing a Punch List or Checklist
17. Providing a survey or job spec or proposal
18. Providing a general form creation capability to gather data
19. Selecting a map location
20. Providing a payment, such as a direct bank payment, credit card payment, or other form of electronic payment
21. Arranging for appropriate delivery format, time, and location for physical and or non-physical goods and services A workflow object as created at step 302 may be general. That is, the workflow object may include functions and methods for performing one of the operations listed above but not yet populated with specific values for a specific situation in which the operation is performed. For example, a workflow object definition for providing a list of appointments (#3) may include functions and methods for providing the list but not include an actual list of appointments and parameters for each appointment when created at step 302.

Creating a workflow object at step 302 may further include providing such data as metadata for the object, defining elements needed to implement the functions of the workflow object, providing authentication tokens used to verify the authenticity of the workflow object, providing lookups for data needed to implement the functionality of the workflow object, and providing functions for viewing or otherwise accessing the data of the workflow object. Examples of elements of a workflow object are discussed in greater detail below.

The method 300 may further include at step 306 performing some or all of discovering, activating, and enabling a workflow object definition. In some embodiments, in order for a workflow object to be used according to the methods described herein it may made available to individuals and groups using the workflow management tool or otherwise using the functionality of workflow objects as described herein. Accordingly, mobile devices 110*a*, 110*b* and/or workstations 108 generating and using workflow objects as defined herein may search or query a published directory in order to access workflow objects as created at step 302. In some embodiments, only those workflow objects that have been activated and enabled for use may be used by a device 110*a*, 110*b* or workstation 108 to create instances of workflow objects as described herein.

Steps 302-306 may be implemented on the server system 102, on a workstation 108, or on a workstation 108 interfacing with the server system 102. In particular, workflow objects as created according to steps 302-306 may be stored in the workflow object database 106.

The method 300 may further include selecting 308 a workflow object definition. Step 308 may be performed on a sending device 110*a* by a user. An interface may be presented on the sending device 110*a* and provide a list of available workflow objects. The interface may be an interface native to an operating system on the sending device 110*a*, a web interface, or some other interface. The list may further include a textual description of a workflow object definition. A user may then select an item from the list in order to generate an instance of the selected workflow object definition.

The method 300 may further include configuring 310 an instance of the selected workflow object. As noted above, each workflow object definition may have a functionality associated therewith. Configuring 310 the instance of the selected workflow object definition may include providing specific data with respect to which the workflow object instance will perform that functionality. Configuration 310 might be per field, or be provided as a blob of JSON (JavaScript Object Notation) or unstructured data on a per workflow object basis. Configuration may further be performed by means of APACHE AVRO, protocol buffers or similar data serialization system.

For example, configuring 310 the instance may include performing a look up of data for a specific element of the workflow object definition. In some embodiments, a constructor or initiator function may be associated with the workplace object. For example, a workflow object definition may define a function to be executed upon the occurrence of an "onConfiguration" event, e.g. upon performing the configuring step 310. Accordingly, this onConfiguration data may be processed in order to look up data, request data from a user, or otherwise configure the workflow object instance to perform its intended functionality.

Configuring 310 the instance may further include specifying one or more recipients for the instance, a start time for an event or tasks associated with the instance, and an end time for the event or task associated with the instance. In some embodiments, recipients to the workflow object instance may be determined automatically based on a conversational context in which configuration occurs. For example, if a workflow object instance is created as part of conversation, the recipients for the workflow object may be implicitly be determined to be other participants of the conversation.

Configuring 310 the instance may further include specifying whether the instance will offer a recipient options of replying "yes," "no," "remind me later," or providing some other response upon receipt of the instance of the workflow object definition.

Configuring 310 the instance may further include specifying a location of an event referenced by or represented by the instance. Configuration may further include specifying a time or date for the event referenced by or represented by the instance.

After receiving inputs for some or all of the values for the configuration step 310, the data options and values for the instance of the workflow object definition may then be finalized.

In some embodiments, the instance may be encrypted 312 prior to transmission to a recipient. The encryption scheme may be any encryption scheme known in the art. In some embodiments, for each instance of a workflow object definition, a transaction identifier 314 may be generated in order to uniquely identify that instance. In order to ensure global uniqueness, the identifier may be obtained from the server system 102 or otherwise coordinate with the server system 102 to ensure uniqueness.

After processing according to some or all of steps 308-314, the instance of the workflow object definition may then be transmitted 316 to a recipient. The instance may be transmitted by the mobile device performing steps 308-314 in a mobile message formatted and transmitted according to a mobile messaging protocol. For example, the workflow object instance may be transmitted by means of XMPP (extensible messaging and presence protocol), SMS, IP (internet protocol), REST API (representational state transfer application programming interface), a data channel, or some other means. The protocol used may be a binary or test-based protocol.

In some embodiments, transmitting the instance may include transmitting a reference to the instance, e.g. URL, or some other reference, such that the recipient may access the instance. In such embodiments, the instance may be transmitted to the server system 102 for storage and retrieval or may be generated and stored by the server system 102 based on configuration values and choices transmitted to the server system 102 by the sending device 110a.

Figure 4:
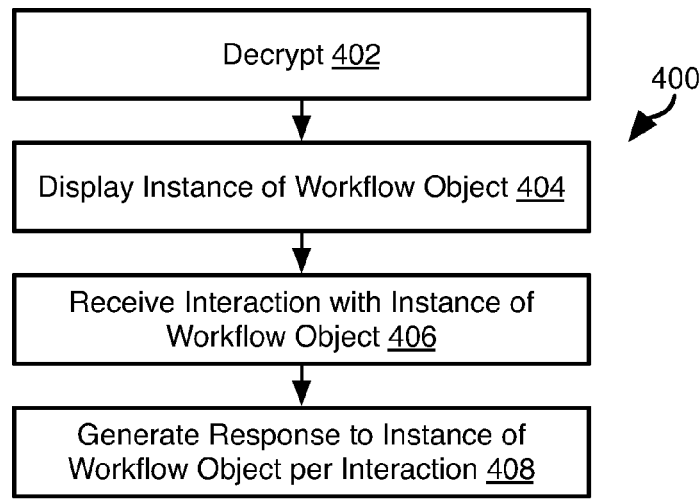
FIG. 4 is a process flow diagram of a method for processing a workflow object on a receiving device in accordance with an embodiment of the present invention.

Referring to FIG. 4, upon receipt, a recipient device 110b may perform the illustrated method 400. For example, the method 400 may include decrypting 402 the workflow object instance. The decrypting step 402 may be according to any method known in the art. In particular, encryption and decryption of the workflow object may be performed using a private key/public key encryption/decryption method. A representation of the workflow object instance may be displayed 404 on the recipient mobile device. For example, one or more data values stored in the workflow object instance may be displayed and one or more user interface elements defined by the workflow object instance or for modifying values of the workflow object instance may be displayed. In some embodiments, the recipient device 110b may validate the sender of the workflow object before processing the workflow object.

The method 400 may further include receiving 406 interaction with the representation of the workflow object. For example, a workflow object may include the ability for the recipient to specify "yes," "no," and/or "remind me later" to a workflow object instance. Accordingly, the method 400 may include receiving one or more of these responses. In some embodiments, a software module for interfacing with the workflow object instance may be executed on the recipient device 110b in order to both render a representation of the workflow object instance and receive interactions with the representation. Interactions with the representation of the workflow object instance may be received and a response generated 408 that includes an indication of the response received, e.g. selection of an option in a list, specifying of "yes," "no," "remind me later," input of text data, or some other input or action received on the recipient device 110b.

In some embodiments, a workflow object instance may be represented initially as an icon, text, link, or some other element. A user may then interact with this initial representation by clicking, swiping, tapping, mouse down event, mouse up event, or some other gesture in order to invoke an interface for responding to the workflow object instance. In some embodiment, user interaction may be a keyboard event such as input of a number or text character according to a text message protocol for handling non-gesture forms of interaction.

Workflow responses may be processed via systems which do not support visual interfaces, and which can accept criteria via a purely text based response system, for example by accepting audio command and converting it to text. General commands may be defined textually such as with some prefix to indicate that text is a command, e.g. a ##[command] or similar namespace may be defined for each individual or set of workflow objects. The basic set of commands may enable acceptance of an option from a list, responding yes to a request, responding no to a request, asking for a summary, asking for detail, adding to a calendar, or some other response.

In some embodiments, a recipient device 110b may reply by text or initiate some other response to the sending device 110a after receiving a workflow object but that is not a response to the workflow object received.

Figure 5:
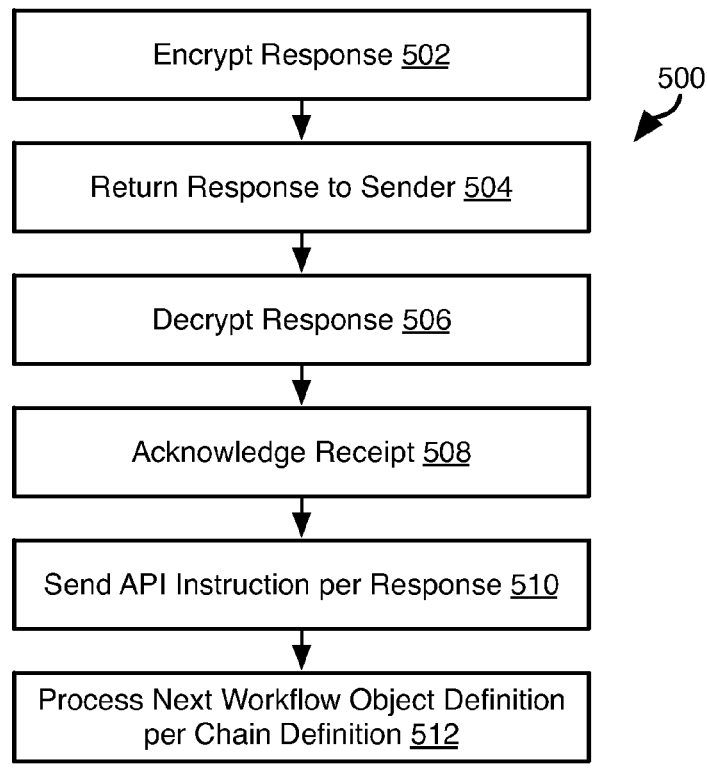
FIG. 5 is a process flow diagram of a method for processing a response to a workflow object in accordance with an embodiment of the present invention.

Referring to FIG. 5, upon receiving interaction with a representation of the workflow object instance on the recipient device 110b, the illustrated method 500 may be used to respond to the device 110b or user that transmitted the workflow object instance.

For example, the response generated at step 408 may be encrypted 502 and returned 504 to the sending user or mobile device. Returning 504 the response may be according to any of the mobile messaging protocols described herein and may be the same as the mobile messaging protocol over which the workflow object instance was received by the recipient device 110b. Upon receipt, the sending device 110a may decrypt 506 the response and may transmit 508 acknowledgment of receipt to the recipient device 110b. Acknowledging receipt of the workflow object may be performed using a pre-defined response code sent over a network, such as a mobile network. Optionally, on receipt of the response by an intermediary, such as the server system 102, the intermediary will acknowledge the receipt of the response back to the sending device 110a, depending on the medium of transport. Optionally, the workflow object on receipt will send a notification to a secondary service, regarding the change of workflow resulting from the response. This will depend on the workflow rules defined for that workflow for that group or business. In some embodiments, the recipient device may further receive an instruction to share the workflow object and, in response, share the workflow object with another device or user. In the case of a workflow object implementing a scheduling request, the effect of sharing the object may be to add the recipients with whom it is shared as participants in the meeting as recorded by the workflow object or in a database associated with the workflow management tool. For example, the workflow management system may add an event defined by the scheduling request to calendars of the participants.

Upon receiving the response, the workflow object instance as defined on the sending mobile device may invoke functionality associated with receipt of a response. Once a response has been made, then it is an attribute of the workflow object and may indicate whether the transaction represented by the workflow object should be altered or voided, subject to a timeout value or expiration date, or whether a new transaction is required. For example a financial transaction will not be changeable after a given amount of time, for example after it has been cleared.

For example, a function of the workflow object instance may be associated with an "onResponse" event. Accordingly, upon receiving the response from the recipient device 110b, the sending device 110a may invoke the function associated with the "onResponse event." In some embodiments, this may include sending 510 an API instruction according to the content of the response. Specifically, the response from the recipient mobile device may be used to call and API function to update a state of a workflow management tool. For example, where the workflow object instance was a request for an appointment and the response was an acceptance of the appointment, the API function call may transmit a request to the workflow management tool to make a record of the appointment and generate appropriate reminders or take other actions with respect to the appointment. Where the response is an update to the status of a task, sending 510 the API instruction may include sending an instruction to the workflow management tool to update the status of the task to the status indicated by the response from the recipient device 110b. The workflow management tool may then execute the API instruction.

As described in greater detail below, a workflow object instance (e.g. current workflow object instance) may invoke another workflow object instance (e.g. subsequent workflow object instance) in response to an event, such as an "onResponse" event. Accordingly, the method 500 may further include processing 512 the next workflow object instance or definition according to a workflow object chain including the current workflow object instance. As noted above, various functionality of a workflow object instance may be implemented. Accordingly, the steps of sending, receiving, responding, receiving the response, and sending an API instruction for a workflow object in the examples given above may proceed as outlined below.

In Person Scheduling (Map Location, Participants, Time, Event Name).

In person scheduling may be performed using the methods disclosed herein to perform one or more of making a reservation or appointment; scheduling an installation, repair, delivery, or other on-location service; generating a reminder for a follow up activity for an in person meeting, such as scheduling a conference call (e.g. an audio or video call defined by some or all of a phone number, participants, time, etc.).

The scheduling of in-person activities according to the methods disclosed herein may proceed as follows:

1. On creation of the scheduling workflow object instance, the workflow object instance may be programmed to sets its defaults based on the participants in the conversation specified by a user that invoked creation of the scheduling workflow object instance;
2. The workflow object instance may determine a default location. For example, depending on the type of interaction being scheduled, the sender's or recipients' known information may be used. For example, the server system 102 may access a database to determine a default address for the sender or recipient, e.g. the business location for either of these parties. The server system 102 may further obtain a default address for one of the participants from third party address information.
3. The workflow object instance may specify as default participants all of the recipients of the workflow object instance. Where the workflow object instance is for an appointment or for possibly other cases, the sender may also be included by the workflow object instance constructor as a participant by default. Additional participants may be added by the workflow object instance in response to the workflow object instance being forwarded to them.
4. A workflow object instance may specify a default time for a scheduled interaction. For example, the current time may be specified as the time. Other may also be selected as a default and may be overridden by a time and/or date received by the workflow object instance from a user that invoked creation of the workflow object instance or a recipient of the workflow object instance.
5. The recipient, upon receipt of the workflow object instance, is added as a participant in the event.
6. The receiver may accept or reject the scheduling proposal, such as by means of an interface to the workflow object instance presented on the recipient device 110b, which will cause the workflow object instance to transmit confirmation of the event back to the server system 102 for updating the workflow database 104 or some other third party database.
7. The recipient may forward the workflow object instance to another party, resulting in the workflow object instance adding that party to the participants and sending confirmation of the event to be sent back to the server system 102 for the added party for updating a record associated with the event being scheduled by way of the workflow object instance.
8. The recipient may further instruct the workflow object instance to add the event to their calendar on the phone or device.
9. The server system 102 updates a system calendar feed for the sender upon recipients accepting or rejecting of invitations or the adding or removal of participants.

Call Escalation/Routing.

The processing of phone calls such as routing of calls or the taking of actions based on a call, e.g. escalation from text to audio and or video. In particular, a workflow object instance as described herein may be used to some or all of start a text, voice, video, or screen sharing session.

Call escalation and routing may be performed as follows:
1. The workflow object instance may include OTT (over-the-top) voice, audio, or video data system information that is set by default by the workflow object instance or in the workflow object definition based on the type of widget selected by a sender for configuration. This information, may be queried by the workflow object instance on configuration or by the server system 102 from a $3^{rd}$ party system for that workflow object type, or as obtained from the service database.
2. The default participant to be called may be set by the workflow object instance to be the sender in a one-to-one conference. In other cases, both the sender and recipient are added by the workflow object instance to the attendees list by default, such as in the case of a conference call where more than two participants are allowed
3. Upon being received or prior to being sent, the workflow object instance may authorize the recipient to initiate the call such as by transmitting authorization to the server system 102 or a third party provide of calling services. In some embodiments, the workflow object instance may provision two accounts on a $3^{rd}$ party system, or on the network of the service system for purposes of conducting the call.
4. Upon selecting call start by the widget on a recipient device, a message may be transmitted to the server system 102. Upon receiving this message, a signaling session may be initiated to establish a direct or relayed media connection for real time media transport between the sender and recipient.

Routing Communications to Appropriate Individual.

In some embodiments, a server system 102 may select a support area of interest and rout a text, voice, video, or screen share session with an individual or group. For example, routing may be performed as follows:
1. A user may click or otherwise select a group in an interface, e.g. web interface, to the server system 102. The group may be an item in a list of customer service options presented in the interface to customers.
2. Once the recipient group is selected by the customer, the session is routed to a particular person according to routing rules. For example, the identity of the customer as well as the selected group may be analyzed according to routing rules to select a particular individual to receive the call, text messaging session, or multimedia conference.

Handling Sensitive Data.

In some embodiments, a server system 102 and widgets as described herein may be used to facilitate handing of sensitive information, such as health information, account information, account balances, authentication information, and the like. For example, sensitive information may be handled as follows:
1. A participant, such as in the context of a text session, voice or video call, voice or video conference, requests from the server system 102 or from another participant confidential information either by text request or as a result of a selection for the type of data from a list.
2. The confidential information is packaged in an encrypted manner by the widget on a device of the participant from whom the information is requested. Where the confidential information is requested from the server system 102, the server system may look up the information with respect to the participant for which the information is requested. Packaging the information may be encrypted in a manner that requires a password or key to decrypt and view the data. The widget or server system 102 then transmit the packaged information to a recipient, e.g. the device or account of participant that requested the information.
3. Upon receipt, the receiver provides the password or key to a widget in order to view the package. The package may be included in a widget transmitted to the recipient or may be transmitted to the widget that received the request for information.
4. The identity of the recipient may be pre-verified but the information may alternatively be packaged in an envelope so that it is not visible unless clicked on by the recipient.
5. Upon the key being entered, or the envelope being opened, the data is decrypted and displayed to the recipient.
6. The proof of authentication may be verified and sent to the server system 102 for validation. If the key provided passes, then the envelope can open in the case where a password or key is required.

Confirmations.

In some embodiments, a server system 102 and widgets as described herein may be used to facilitate providing of confirmations for one or more activities, such as acknowledging receipt of payment, making of appointments, or returning a poll result. For example, confirmations may be processed as follows:
1. Data to be confirmed is selected from a third party system or by the server system 102.
2. The data is sent to a sender from recipient documents, e.g. the data to be confirmed is identified from among recipient documents. The recipient's documents may be actual documents, or virtual ones obtained from a server system 102 or third party database.

Contact Information.

In some embodiments, a server system 102 and widgets as described herein may be used to facilitate providing contact information and for placing calls using such information. For example, contact information may be provided as follows:
1. An interface may be provided by a server system 102 that provides a navigation pathway through a company directory. Using this interface, a user may locate a virtual contact card recording contact information for a particular individual. Upon navigating to the listing for an individual or otherwise interacting with the listing, the virtual contact card may be transmitted by the server system to the user. The virtual contact card may contains basic information about the employee, as obtained from the local system or $3^{rd}$ party database
2. The card may be provided in a widget sent to the requesting user and may be displayed in an interface providing links or buttons to begin different types of communication.

Forms/Lists.

In some embodiments, a server system 102 and widgets as described herein may be used to facilitate presenting of forms and lists for review or input of responses. For example, the server system 102 and widgets may be used to distribute and collect responses to a survey, questionnaire, poll, punch list, customer satisfaction (CSAT) rating, and selection of parameters for a meeting (times, locations, people, classes, items). A company directed may also be distributed by the server system 102 and one or more widgets. For example, forms and lists may be distributed as follows:

1. Different types of forms may have different default characteristics—some may be accessed by the server system from a database of pre-defined forms, such as a particular poll, CSAT, questionnaire, or checklist. Other types may require querying of a system or third party database by the server system 102 or a widget to get the data that is relevant to the function at hand. For example a list of directory numbers, people, times, locations or items may be retrieved from a database, such as the workflow database 104. Some items that are designed for input from the recipient may be empty.
2. The items in the form may be addressed to an individually recipient, but may also be sent to a group of recipients. The responses from each group member may be transmitted separately by the server system 102 or third party database, where each form would be a distinct communication from the sender to a receiver.
3. Upon receipt of a widget including a firm by a recipient, the form is enabled on the recipient device for interaction, i.e. receiving inputs to the form.
4. If the widget includes a list, the user may be able to select an individual element and invoke transmission of a response for that individual element to the sender.
5. If the widget includes a form type of element with multiple items to fill out and where a confirmation is required before sending back the data to the sender, the widget may define interface elements enabling a recipient to invoke acceptance, delivery, or execution or other instruction to indicate that the form is completed and ready to be returned.
6. If a widget is of a punch list type, the widget may present an interface enabling a recipient to check off the completion state of various tasks in the list. The punch list widget may further define an interface for receiving additional notes, or even add additional items to the list as they are discovered in the course of work.
7. The widget may report inputting of the completion state and any notes or additional items to the server system 102 or a third party database for updating a state of the workflow database 104.

Document Delivery, Review, and Signing.

In some embodiments, a server system 102 and widgets as described herein may be used to facilitate delivering documents for review, acceptance, and or signing. For example, a contract, invoice, estimate, purchase order, blueprint, or some other document may be presented transmitted for review and acceptance using workflow objects as disclosed herein. For example, documents may be delivered for review and acceptance thereof processed as follows:

1. The sender may select a document for the purpose of delivery to the receiver to obtain a digital signature, or just for the purpose of sending a copy for some other purpose, such as review or viewing. The document may be associated with a workflow object by the sender.
2. The document may be a watermarked document that doesn't require a signature in order to validate the authenticity of the document.
3. The document may be in an encrypted format that encapsulates some other type of standard document format. This format may be provided by a third party service or by an internal encryption mechanism
4. The sender may select a set of areas of the document that have the need to have initials or signatures within the document. An interface for receiving this selection may be provided on the sending device 110*a* and these selections may be associated with the workflow object instance.
5. The address of the package of documents will default to the recipient in the conversation in which the workflow object instance is created and sent. The sender may be specified in the workflow object instance by default as the party who is authorizing the document
6. The documents may or may not be forwarded to a party other than the recipient. The signing party is the recipient in the case of document signing. Typically a document is not permitted by the server system 102 or workflow object instance be forwarded to another for signing, but the sender may be permitted to send a document to multiple persons for signature or review.
7. Once the document is opened on a recipient device 110*b*, a workflow object instance may invoke storage in a document store that is local to the device 110*b*, or it may be optionally backed up to a folder by the server system 120 or some other third party document storage location
8. The document signatures may be captured from the recipient by the workflow object instance on the recipient device 110*b*. The signature may be captured using any electronic signature approach known in the art, such as a password, capture of a signature on a touch sensitive area, or some other means.
9. The workflow object instance may transmit signatures received the server system 102 or third party database for storage. The workflow object instance may refrain from reporting to the server system 102 that the document is finalized until the recipient indicates to the workflow object instance through an interface that the signature is final and that the recipient wishes to transmit the document. Upon receiving an indication that the recipient believes the signature is final, the workflow object instance may report to the server system 102 that the recipient has signed the document and the server system 102 may record in the workflow object database 104 that the recipient has signed the document.
10. In some embodiments, a report of signing may be reported by the workflow object instance on the recipient device 110*b* to one or more other parties, such as the sender. For example for the signing of the blueprint, the final watermarked version may be shared to the owner of the house, whether the owner is the sender or recipient or not. However this reporting may be performed independently from the actual signing process. For example, the workflow management tool or a third party service or service database may provide this notice automatically, such that an interested party may see the result of the signing.

The actions taken in the list above on the recipient device 110*b*, e.g. the presentation of an interface and/or receiving information may be performed by processing the functions and data of a workflow object instance generating by the sending device 110*a*. Likewise, the requests for information sent by the sending device 110*a* may be packaged in the workflow object instance.

FIGS. 6, 7, 8 and 9 illustrate a possible application for workflow objects or "widgets." In particular, FIGS. 6, 7, 8, 9 illustrate how a chain of widgets may be defined using a device 110*a*, 110*b* or other computing device 108 to implement an arbitrary workflow.

Figure 6:
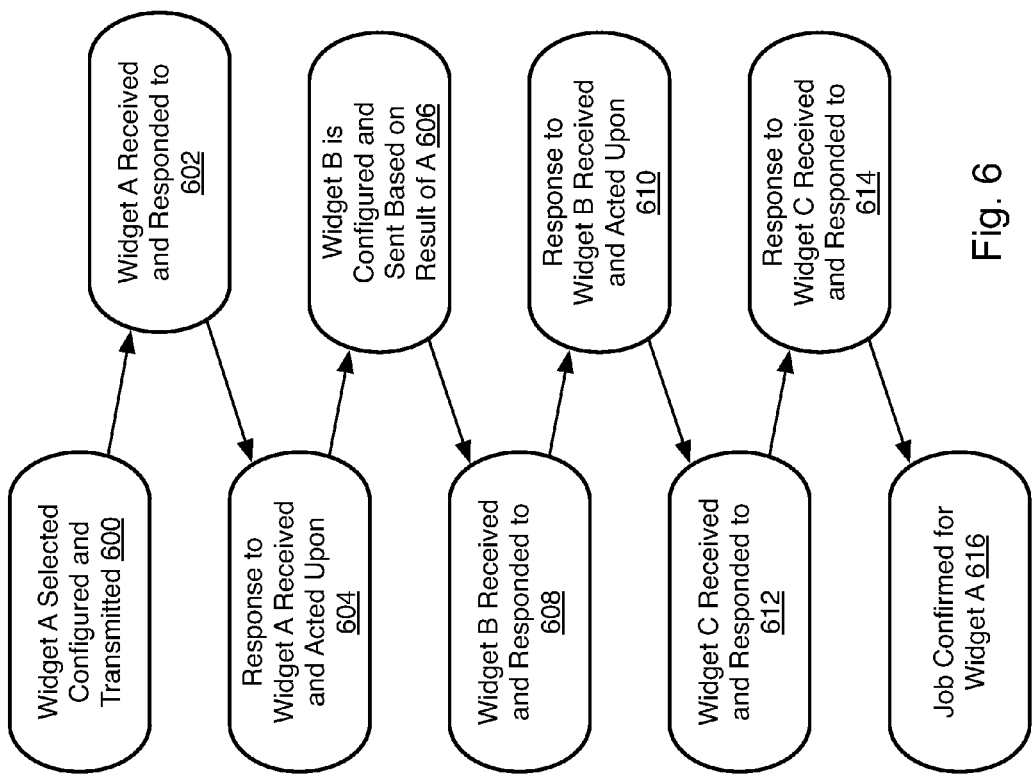
FIG. 6 is a process flow diagram of an example interaction including a workflow object in accordance with an embodiment of the present invention.

Referring specifically to FIG. 6, a widget chain may be configured as shown. At step 600 a widget A is selected, configured, and transmitted by a sending device 110*a* in the manner described above with respect to FIG. 4. At step 602, widget A is received and responded to by a recipient device 110b, such as in the manner described with respect to FIGS. 4 and 5. At step 604, the response to widget A is received an acted upon as defined by widget A. At step 606, widget A responds to the received response by configuring and transmitting widget B from sending device 110a based on the response to widget A.

At step 608, widget B is received and responded to by the recipient device 110b. At step 610, a response to widget B is transmitted form the recipient device 110b to the sending device 110a. Widget B process the response and invokes configuration and sending of widget C, which is likewise received and responded to by the recipient device 110b at step 612. The response to widget C is received and responded to by the sending mobile device at step 614, such as by means of functions defined by widget C. If widget C is the last widget in the chain, then the job commenced by widget A may be confirmed complete at step 616. In some embodiments, the completion of processing of a last widget in a chain may generate an event indicating completion of the chain, the event being different from or in addition to an event that may be triggered by the last widget itself completing.

Although the chain of FIG. 6 is described as the exchange of widgets between a single sending device 110a and a single recipient device 110b, other methods are also possible. For example, widget A may go to a first recipient mobile device, whereas widgets B and C are transmitted to a different recipient mobile device or B and C are each transmitted to different recipient mobile devices from each other and from widget A.

Figure 7:
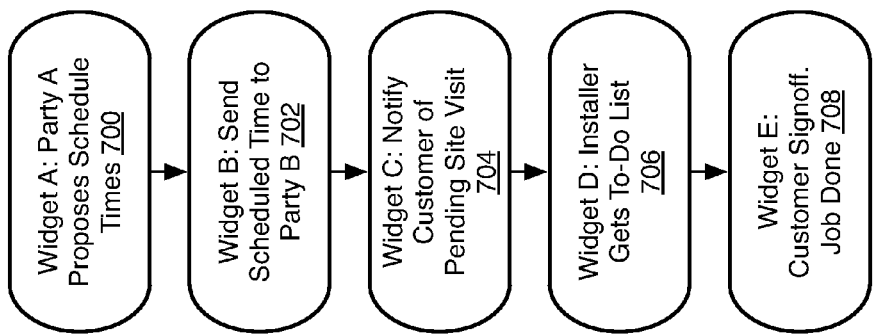
FIG. 7 is a process flow diagram of an example application for workflow objects in accordance with an embodiment of the present invention.

FIG. 7 illustrates a practical application of a widget chain. For example, at step 700 widget A is defined that proposes a schedule time. At step 702, widget B is defined that sends the scheduled time to party B. At step 704, widget C is defined that notifies a customer of a pending site visit. At step 706, an installer receives a to-do list. At step 708, widget E obtains customer signoff and the job is deemed complete. Each of the widgets A-E may have as a function to perform in response to a response thereto the invocation of a subsequent widget: A invokes B, B invokes C, C invokes D, and so on. As noted above, each widget A-E may be transmitted to the same recipient mobile device or may go to different recipient mobile devices from one another.

Figures 8, 9:
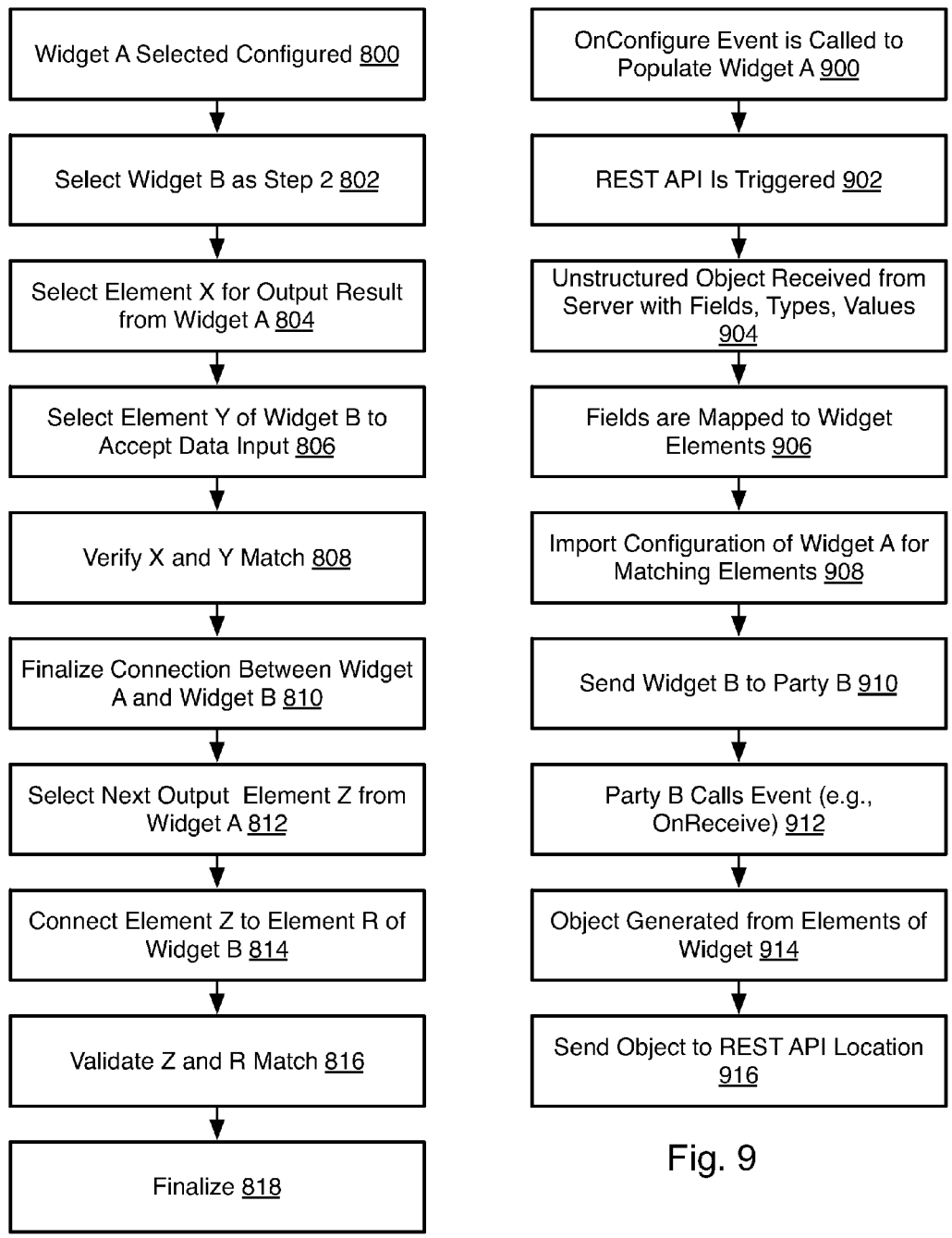
FIG. 8 is a process flow diagram of a method for generating a workflow object chain in accordance with an embodiment of the present invention.
FIG. 9 is a process flow diagram of a method for defining a workflow object in accordance with an embodiment of the present invention.

FIG. 8 illustrates another example wherein the outputs of one widget may be tied to the input of another widget. Widget A is selected 800 and configured as described above. Widget B is selected 802 as step 2 in a widget chain. Element X is selected 804 as an output result for widget A and element Y of widget B is selected 806 to accept the data input from widget A (element X). In some embodiments, the method may include verifying 808 that element X and element Y are compatible, e.g. the same data type, number of elements, or other matching criteria. In some embodiments, a proposed pairing of output element X and input element Y may be rejected or throw an error if they are found to be incompatible.

If element X and Y are found to be compatible, then the connection between widget A and widget B through the output/input relationship of elements X and Y is finalized 810, e.g. stored in the widget instances A and B.

In some embodiments, multiple elements of widget A may be coupled to more than one input element of one or more different widgets. For example, element Z from widget A may be selected 812 and connected 814 to input element R of widget B, or some other widget. If elements Z and R are validated at step 816, then the connection may be finalized at step 818. If no more widgets are to be added, then the widget chain may be stored, transmitted, or processed according to the methods described herein.

A chain may be continued to add one or more widgets as well. For example, one or more output elements of widget B may be connected to one or more input elements of some other widget C in the same manner that outputs of widget A were connected to inputs of widget B. A chain of two, three, or any number N of widgets may be defined by connecting outputs of one widget to the inputs of another in the illustrated manner.

FIG. 9 illustrates a specific example of widgets may be implemented. For example, an "onConfigure" event may be called 900 to populate widget A. A REST API call is triggered 902 to request an object definition for widget A from the server system 102. In response, the server system 102 may send an unstructured object with fields, types, and values corresponding to the definition for widget A. This unstructured object is received 904 and the fields thereof are mapped 906 to desired widget elements. Examples of possible widget elements to which a widget may be mapped are discussed below with respect to FIG. 13.

The configuration for widget A for all matching elements mapped at step 906 may then be imported 908. Importing 908 may include obtaining data objects defining the elements to be added to widget A from the server system 102 or some other source and adding them to widget A.

Widget A may then be sent 910 to party B. Upon receiving widget A on a recipient device 110b, an event may be called 912 for widget A, e.g. an "onReceive," "onResponse," or some other event triggered form interaction with a representation of widget A. In response, an object may be generated 914 that implements widget A, such as a JSON (JavaScript Object Notation), XML (extensible markup language), or some other type of object. This object may then be sent 916 to a REST API location specified by widget A. For example, step 916 may refer to taking the data format of the workflow object definition and serializing it to a datastore via an API. In other words, saving the final data representation to a database. For example, instead of the workflow object just existing as an internal data structure exchanged between devices 110a, 110b, a workflow object may created and shared according to the method described herein. The workflow object definition may be defined using an APACHE AVRO format or other DDL (data description language), and provided by a third party vendor by way of an entity operating a server system 102 to perform the methods described herein. A workflow object definition can be serialized and transmitted to a sending device 110a. The workflow object definition may the n be deserialized on the sending device 110a and configured to generate a workflow object instance. For example a JSON description of the workflow object definition could result in a workflow object instance being defined, and similarly, the workflow object instance could be serialized back into another semi-structured, or unstructured communicable form for transmission via SOAP or REST API.

Figure 10:
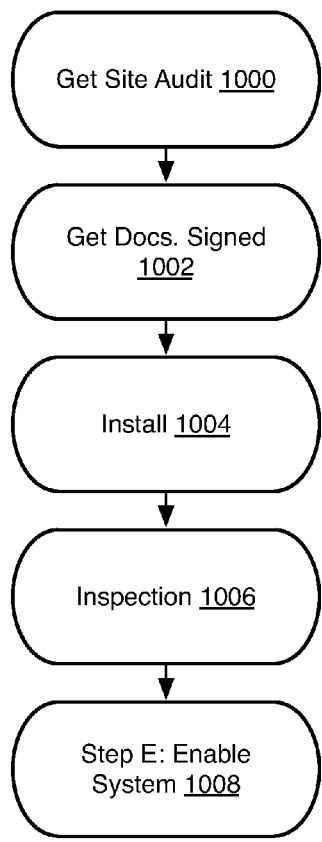
FIG. 10 is a process flow diagram of an example application of a workflow object chain in accordance with an embodiment of the present invention.

FIG. 10 illustrates another example of an application of widget chains to a specific workflow. For example, at step 1000 a widget is defined that schedules or verifies occurrence of a site audit. At step 1002, a widget is defined that obtains document signatures, such as an authentication or endorsement of a report of the site audit. At step 1004, a widget is defined to coordinate installation of equipment. At step 1006, a widget is defined to schedule and verify inspection of the installation. At step 1008, a widget is defined to coordinate enabling of the installed equipment. Each of the widgets defined at steps 1000 through 1008 may itself be a widget chain with one or more widgets connected to one another. Likewise, each widget of each step 1000-10006 may be connected to a subsequent widget in a following step 10002-1008 such that a widget chain is formed that may be a chain of chains. For example, each chain of widgets may be referred to as steps in a workflow such that one step must be completed before another may begin.

Figure 11A:
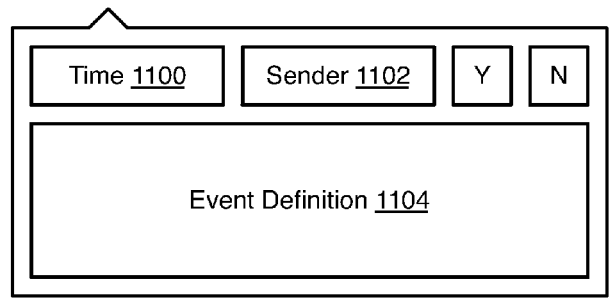
FIGS. 11A and 11B are example interfaces for presenting workflow objects in accordance with an embodiment of the present invention.
Figure 11B:
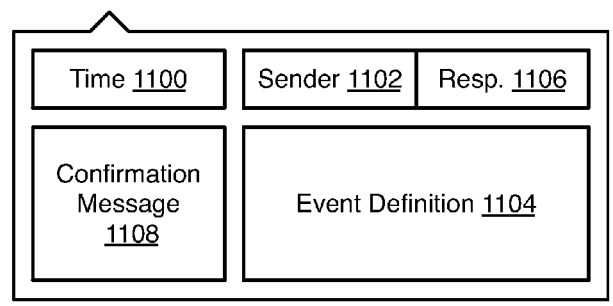

FIGS. 11A and 11B illustrate example interfaces to a widget. For example, the interface of FIG. 11A may be displayed on a recipient device 110b responsive to receiving a widget from a sending device 110a. The interface of FIG. 11B may be displayed on a sending device 110a in response to receiving a response from the recipient device 110b.

As shown in FIG. 11A, an interface may include a time 1100 indicating a time that a widget was received, a sender field 1102 including an identifier of the sender of the widget, one or more user interfaces for receiving inputs from the recipient (e.g. the "Y" and "N" fields for accepting or rejecting). The interface 1100 may further include an event definition 1104. For example, where the widget is an invitation to join a meeting, keep an appointment, or perform some other tasks, the event definition 1104 may define the time, date, location, parties, or other attribute of the meeting, appointment, or task. As noted above, various elements may be associated with a widget, such as a checklist, map, poll, or any of the other possible elements described herein. Accordingly, the event definition field 1104 may include a rendering, representation, or interface to one or more elements of a widget.

Referring to FIG. 11B, an interface displayed in response to receiving a response to a widget on a sending device 110a may include a time 1100 at which the response was received, an identifier for the sender 1102, an identifier of the responder 1106, a confirmation message 1108 or other information provided by the recipient for the widget, and the event definition 1104 or other representation, rendering, or interface to the element or elements of the widget.

Figure 12:
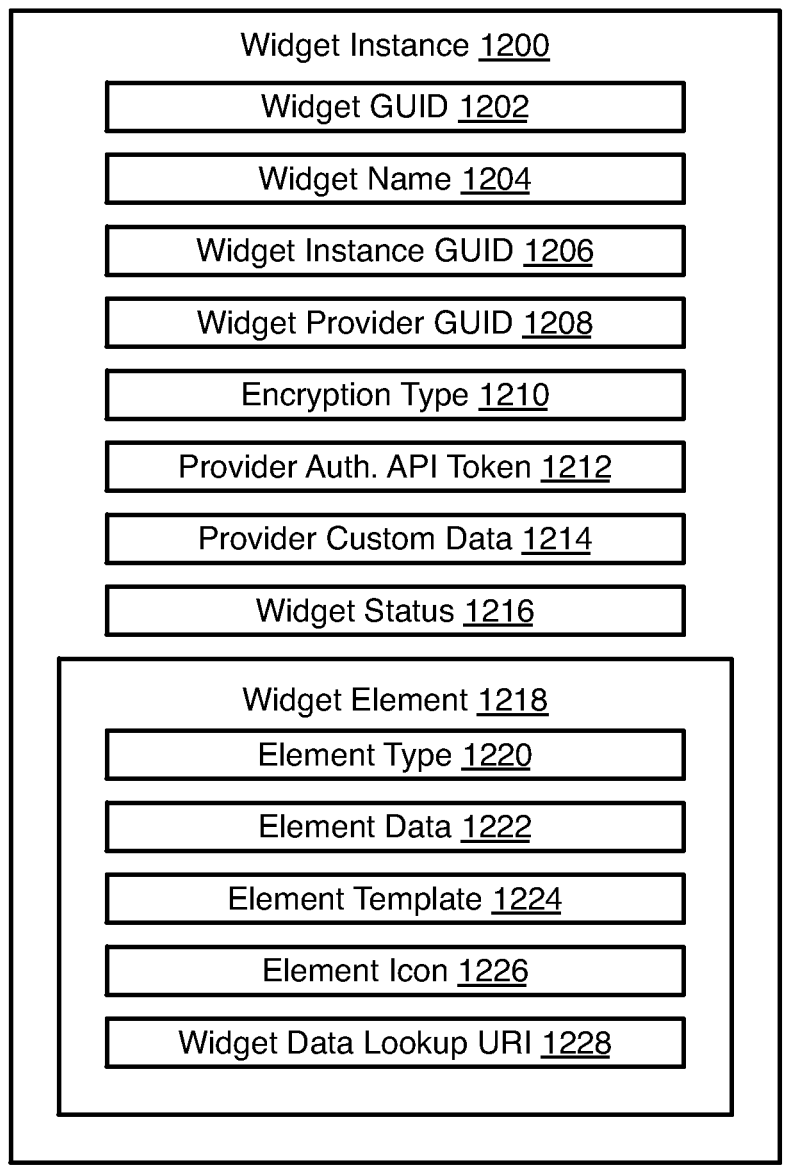
FIG. 12 is a schematic block diagram of data structures of a workflow object in accordance with an embodiment of the present invention.

Referring to FIG. 12, a widget instance 1200 may have some or all of the illustrated attributes. For example, a widget instance 1200 may include a global unique identifier (GUID) 1202. The GUID 1202 may be globally unique within some scope. For example, among all widget definition generated by or for a company, each may have a unique GUID. Where a server system 102 provides services as disclosed herein for multiple entities, the same set of identifiers may be used for each entity. Alternatively, all widgets may be generated and used with respect to the server system 102 may be unique regardless of entity.

A widget name 1204 may identify a widget definition or class of which widget instance 1200 is an instance or may be a title given to it by a user upon configuration in order to provide a human-understandable label.

The widget instance GUID 1206 may uniquely identify a particular instance of a widget definition whereas GUID 1202 uniquely identifies a particular widget definition of which widget instances may be instantiated.

Widget provider GUID 1208 may uniquely identify a user who invoked creation of a widget definition or an instance of a widget definition. For example, provider GUID 1208 may be a global identifier for a developer or entity that created a widget definition.

The encryption type 1210 indicates the type of encryption to be used in encrypting and decrypting the widget instance 1200. Provider authentication API token 1212 may be used by a widget instance 1200 to perform authentication with the server system 102 in order to issue API instructions to the workflow management tool.

Provider custom data 1214 may include one or more data values associated with a widget definition of which the widget 1200 is an instance. Accordingly the widget instance 1200 may include variables for these values and possibly values assigned to these values as the widget 1200 is configured and used according to the methods described herein.

Widget status 1216 may indicate the status of the widget instance 1200 in its life cycle. For example, a widget may be configured but not sent, sent but not responded to, responded to, or ended. A widget 1200 may be ended when functions associated there with have been performed and no further functions are to be performed. For example, after a widget has been transmitted, a response received, and any corresponding actions to be taken based on that response have been performed, the widget may finish execution and may be de-instantiated, i.e. garbage collected so that the memory occupied thereby may be reused. In some embodiments, a widget instance 1200 may be set to expire at a certain time after it is created, sent, or received by a recipient device 110b. Accordingly, an expiration time may also be included in the data defining a widget instance 1200.

In some embodiments, recipient device 110b may share a widget with one or more other mobile devices. In some embodiments, a widget instance 1200 may have a parameter set to indicate whether or not sharing is permitted. If the parameter indicates that sharing is not permitted then sharing of the widget may be prevented such as by a software module rendering the widget refusing to present the option to share the widget or the widget itself lacking the functions to perform sharing. Otherwise, if sharing is enabled, interface elements and functions to enable sharing may be provided on the recipient device 110b. In some embodiments, a recipient of a shared widget may be able to view the widget but not modify the widget or provide a response thereto to the sending device 110a. In some embodiments, a parameter of a widget instance 1200 may permit a recipient of a shared widget to modify the widget or respond to it. For example, if the workflow regards an internal meeting, sending a widget to another recipient would imply adding the additional party to the workflow if it is a meeting or appointment request, adding additional signers to a document, or changing the owner of the workflow.

In some embodiments, a widget instance 1200 may be editable by a user that created it or a recipient. Accordingly, a parameter of a widget instance 1200 may specify whether the widget instance 1200 can be modified and by whom after the widget instance has been created and populated with data values.

A widget instance 1200 may have a widget element 1218 associated therewith either as part of the widget definition or associated therewith during configuration of the widget. An element 1218 may have some or all of the listed attributes associated therewith.

As noted above, a widget instance 1200 may request or receive a response. Accordingly, a widget instance 1200 may include functions and data specifying whether a response is requested or permitted and defining what response is requested is permitted, e.g. the data type or interface by which the response is received.

Figure 13:
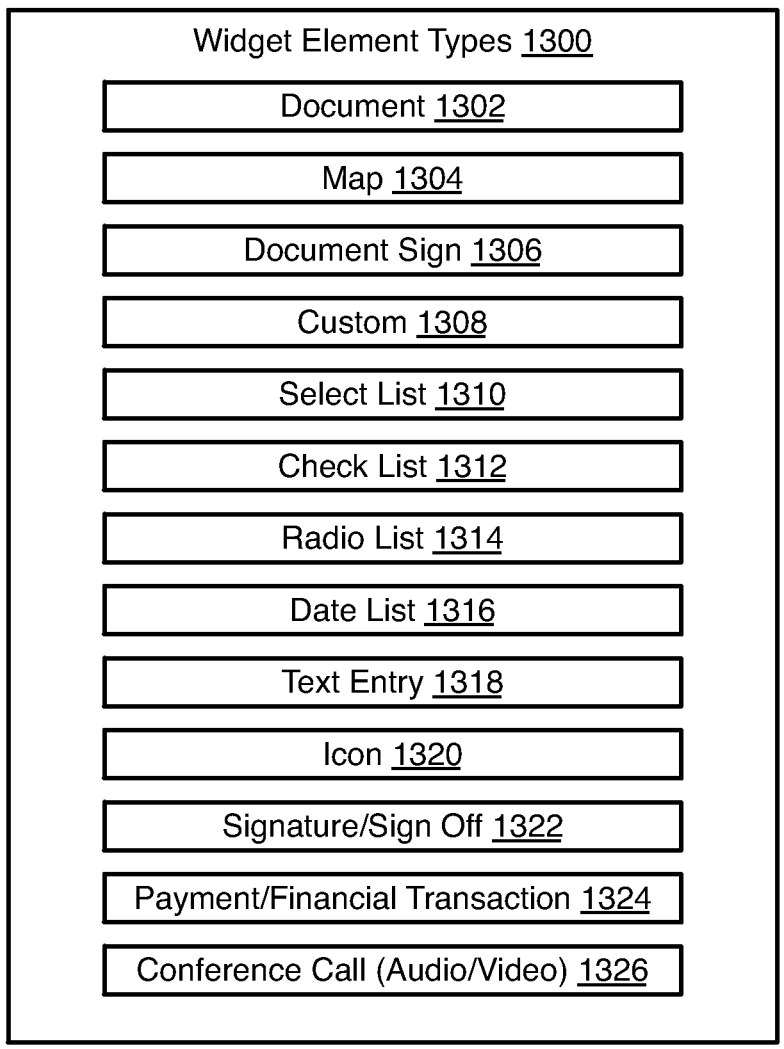
FIG. 13 is schematic block diagram of element types for a workflow object in accordance with an embodiment of the present invention.

For example, a widget 1218 may have an element type 1220 that may correspond to one of the element types listed in FIG. 13 or some other type. Element data 1222 may include that data which is sufficient to render the element functional. For example, where the element is a map, element data may include location data or actual cartographic information that is accessed using the map element.

An element template 1224 may define values and value types that may be specified by a user in order to create an instance of that element and perform the functions associated with the element. An element icon 1226 may define a graphical symbol used to represent the element in a graphical user interface (GUI) representation of the element in a widget.

A widget data lookup URI (uniform resource identifier) 1228 may specify a network accessible location for data used by the element 1218. Considering again a map element, the URI may be the location of cartographic data used to render a map or perform navigation functions.

FIG. 13 illustrates a number of element types 1300 that may be associated with a widget definition and/or widget instance. A document 1302 may be an object containing editable textual data and may include formatting information as well. The document 1302 may be an XML document or some other type of document. A map 1304 may be an object containing cartographic data and may include overlay data such as address information, company locations, or other information that may be associated with a particular geographic location. A map element 1304 may define functions used to navigate and search geographic data as well as select a geographic location and provide a representation of the geographic location (e.g. GPS coordinates) to another function or computer system.

A document sign element 1306 may be an object for storing a verifiable signature, e.g. digital signature, provided by a user in order to receive in a highly reliable manner a signature of a user and provide proof of that signature to some other function or computer system.

An element 1300 may include a custom element that defines functions and methods defined by an end user to meet a particular need. A select list 1310 may define an object with a number of data values and provide functions for displaying the data values, receiving a selection of one of the data values, and providing the selected data value to a calling function or computer system. A radio list 1314 may likewise be an object including a plurality of data values and providing functions for displaying the data values, receiving a selection of one or more of the data values, and providing the one or more selected data values to a calling function or computer system. A date list 1316 may likewise be an object including a plurality of dates and/or times and providing functions for displaying the dates and/or times, receiving a selection of one or more of the dates and/or times, and providing the one or more selected dates and/or times to a calling function or computer system.

A text entry element 1318 may be an object defining functions for receiving text, displaying received text, performing editing of received text, and outputting text to a calling function or computer system.

An icon element 1320 may be an object including one or more icons and providing an interface for a user to select the one or more icons. For example, an icon element 1320 may be an object including functions for displaying N icons and receiving a selection of M of the icons (M=0 to N). The icon element 1320 may further provide the number of icons selected to a calling function or computer system. The icon element 1320 may therefore be used to receive a user rating of a product, interaction, or some other thing.

A signature/sign off element 1322 may be an object including functions for displaying data, such as the status of a task or project and for receiving in a highly reliable manner a user signature that authenticates the user and reliably indicates that the user has signed off with respect to the displayed data. The element 1322 may further provide an output to a calling function or computer system indicating that signing off with respect to the displayed data has or has not occurred.

A payment or financial transaction 1324 element may be an object including functions for some or all of receiving payment information, receiving authorization for payment, securely processing payment, providing confirmation of payment, or other functions associated with a financial transaction.

A conference call element 1326 may be an object including functions for some or all of adding participants to a list of participants, sharing invitations to join a call, initiating a call, ending a call, or performing other functions associated with a call.

Figure 14:
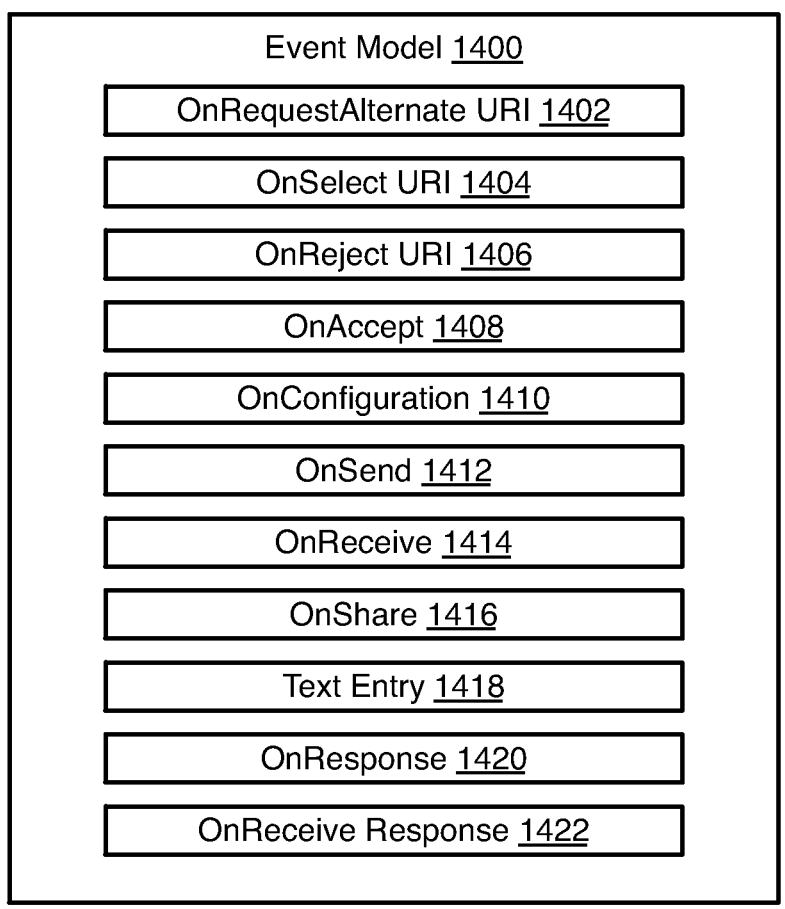
FIG. 14 is a schematic block diagram of events for a workflow object in accordance with an embodiment of the present invention.

FIG. 14 illustrates an event model 1400 that may be used for a widget. The event model 1400 indicates events that may be detected or passed to a widget and with which a function may be associated. When an event occurs, any functions associated with that event may be executed.

The event model 1400 may include an "onRequestAlternateURI" event 1402 that enables a recipient or sender to request additional options, e.g. if a sender configures a widget to provides options x, y, and z a recipient may respond to the widget by providing an additional options, thereby triggering an "onRequestAlternateURI" event.

An "onSelectURI" event 1404 may occur when a selection is made, such as of an option on a recipient device 110b. The selection may then be transmitted to a destination specified by function defined for the "onSelectURI" event 1404.

An "onRejectURI" 1406 event may occur when a rejection is received for a widget on a recipient device 110b. In response, a function associated with this event may then be invoked.

An "onAccept" event 1408 may occur when a recipient of a widget instance selects an interface element indicating acceptance. For example, a widget may present interface elements indicating "yes," "no," and/or "remind me later." Accordingly, the "onAccept" event may occur upon a user selecting the "yes" interface element. A corresponding "onReject" event may be generated upon a recipient indicating rejection to the widget instance.

An "onConfiguration" element 1410 may occur when a user configures a widget according to the methods described herein, i.e. specifies configuration values for a widget definition when creating a widget instance.

An "onSend" event 1412 may occur when a widget instance is transmitted to a recipient device 110b. An "onReceive" event 1414 may occur when a widget instance is received by a recipient device 110b. The "onReceive" event may occur on the sending device 110a as well, e.g. upon receiving acknowledgement of receipt of the widget.

An "onShare" event 1414 may occur upon a recipient of a widget attempting to transmit the widget to one or more other users or otherwise making the widget accessible to other users. A "Text Entry" event 1418 may occur upon a user typing or otherwise inputting text into a text entry field defined by a widget. In some embodiments an "onResponse" event may be generated on the recipient device 110b upon a user entering a response to a widget received on the recipient device 110b. An "onReceiveResponse" 1422 may occur when the sending device 110a receives a response to a widget transmitted from the sending device 110a.

As is readily apparent from the foregoing disclosure, the systems and methods disclosed herein provide a means for implementing a workflow using a mobile messaging protocol and makes performing workflow management tasks as easy as having a conversation using a mobile messaging protocol.

Although the forgoing methods have been described with respect to sending and receiving mobile devices 110, one or both of the sending and mobile devices may be a desktop or laptop computer. The sending and receiving mobile devices 110*a*, 110*b* may be embodied as a smart phone, tablet computer, or other computing device having some or all of the attributes of the computing device 200 of FIG. 2.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A method comprising:
   providing on a server system a workflow service for creating and maintaining a state of a workflow and modifying a state of the workflow;
   receiving, on a first device, a workflow object definition defining a workflow action;
   transmitting by a first device a message over a messaging protocol to a second device, the message including a workflow object according to the workflow object definition, the workflow object including executable code in the workflow object effective to all of (a) generate an interactive interface, (b) receive user inputs to the interactive interface, and (c) transmit an update to the state of the workflow to the server system in response to the user inputs;
   receiving, on the second device, the message from the first device first device;
   presenting, on the second device, the message in an interactive interface by executing the executable code included in the workflow object;
   receiving, on the second device, interaction with the interface; and
   processing, by the executing the executable code of the workflow object executing on the second device, the interaction, the processing including transmitting, by the workflow object to the workflow service, the update to the state of the workflow responsive to the interaction with the representation of the workflow object.

2. The method of claim 1, wherein receiving, on the first device, the workflow object definition comprises:
   selecting a predefined workflow object from a plurality of predefined workflow objects;
   specifying initial parameters for the predefined workflow object;
   receiving at least one of an event and an action definition; and
   generating the workflow objected based on the initial parameters and the at least one of the event and the action definition.

3. The method of claim 2, wherein specifying the parameters for the predefined workflow object comprise defining one or more of:
   a list having selectable items;
   a radio button list;
   a checklist;
   a document;
   a map;
   a document signing interface;
   a custom function definition including custom data;
   a date selection interface;
   a date list having selectable items;
   a text entry field;
   an icon;
   a signature collection field;
   an electronic signature field;
   an amount of a payment;
   a number or a list of numbers;
   a rating input field;
   a set of labels indicating the purpose of each element; and
   a secured information field requiring additional authentication.

4. The method of claim 1, further comprising generating the workflow object according to the workflow object definition by associating a global object identifier with the workflow object.

5. The method of claim 4, further comprising generating the workflow object according to the workflow object definition by associating an authorization key with the workflow object and identifying the validation and source of the workflow object.

6. The method of claim 1, wherein receiving the workflow object definition further comprises:
   receiving an event definition; and
   receiving an action definition, the action being performed by the workflow object upon detecting occurrence of an event corresponding to the event definition;
   wherein the method further comprises:
   detecting on the second device, occurrence of the event subsequent to receiving the message;
   invoking by the workflow object on the second device, an action corresponding to the at least one of the event and the action definition.

7. The method of claim 6, wherein the action definition is generation of a second workflow object and transmitting the second workflow object within a second message according to a mobile messaging protocol to one of the first device and a third device;
   wherein the second workflow object includes executable code effective to generate a second interactive interface;
   wherein the executable code of the second workflow object is further effective to transmit a second update to the state of the workflow in response to detecting interactions with the second interactive interface.

8. The method of claim 7, wherein receiving the workflow object definition comprises receiving a workflow object chain including an initial workflow object, each workflow object in the workflow object chain following the initial workflow object being invoked by a preceding workflow object in the workflow chain;
   wherein the first workflow object and the second workflow object are objects in the workflow object chain;
   wherein each object of the workflow object chain includes executable code effective to present an interface of the each object;
   wherein the executable code of each object of the workflow object chain is further effective to send an update to the state of the workflow in response to detecting interactions with the interface of the each object;
   wherein the workflow is further programmed to transmit a subsequent workflow object in the workflow object chain to one of the first device, third device, and another device in response to the updates to the state of the workflow from the objects in the workflow object chain.

9. The method of claim 1, wherein transmitting, by the workflow object to the workflow service, the update to the status of the workflow responsive to the interaction with the representation of the workflow object comprises at least one of:
 transmitting a text conversation to a third device;
 providing a date selection;
 making an appointment according to a received date selection;
 updating a task as being completed;
 associating a digital signature with a document;
 associating a digital signature with at least one of a transaction and an event;
 setting up one of an audio, video, and screen sharing conference;
 adding a response to poll data;
 updating a work estimate;
 updating a checklist;
 storing a survey response;
 storing a form according to received responses;
 processing payment;
 authorizing payment;
 indicating a read status of a document;
 making a decision as to a location;
 making a selection regarding a person from a directory; and
 viewing private or secured data by requiring at least one of a password and a validation step.

10. The method of claim 1, wherein the messaging protocol is a one of a data transfer protocol and a message transfer protocol.

11. A system comprising:
 a server system comprising one or more processors programmed to implement a workflow service generating and maintaining a status of a workflow and updating the status of the workflow;
 a first device comprising one or more processors programmed to:
  receive a workflow object definition defining a workflow action, the workflow object definition defining one or more elements and one or more activities to be performed responsive to one or more events of an event model;
  transmit a message over a messaging protocol to a second device, the message including a workflow object according to the workflow object definition, the workflow object including executable code effective to all of (a) generate an interactive interface, (b) receive user inputs to the interactive interface, and (c) transmit an update to the state of the workflow to the server system in response to the user inputs; and
 the second device, the second device comprising one or more processors programmed to:
  receive the message; and
  present the message by executing the executable code included in the workflow object to generate the interactive interface;
  receive interaction with the interactive interface;
  process the interaction with the executable code of the workflow object, the executable code invoking sending of the update to the status of the workflow to the server system responsive to interaction with the representation of the workflow object.

12. The system of claim 11, wherein the first device is further programmed to receive the workflow object definition by:
 creating a workflow object from one of a) one or more constituent elements and b) receiving selection of a predefined workflow object from a plurality of predefined workflow objects;
 receiving specification of parameters for the workflow object; and
 modifying the workflow object based on the parameters.

13. The system of claim 12, wherein receiving specification of the parameters for the predefined workflow object comprises receiving specification of one or more of:
 a list having selectable items;
 a radio button list;
 a checklist;
 a document;
 a map
 location coordinates;
 a document signing interface;
 a custom function definition including custom data;
 a date selection interface;
 a date list having selectable items;
 a text entry field;
 an icon;
 a signature collection field;
 an electronic signature field;
 a rating input field;
 a payment amount;
 a number;
 a list of numbers;
 labels indicating a purpose of one or more data elements;
 a secured information field requiring password or authentication.

14. The system of claim 11, wherein the first device is further configured to generate the workflow object according to the workflow object definition by associating a global object identifier with the workflow object.

15. The system of claim 14, wherein the first device is further configured to generate the workflow object according to the workflow object definition by associating an authorization key with the workflow object.

16. The system of claim 11, wherein the first device is further programmed to receive the workflow object definition by:
 receiving an event model definition; and
 receiving an action definition, the action being performed by the workflow object upon detecting occurrence of an event corresponding to the event model definition;
 wherein the second device is further programmed to:
  process events as appropriate according to the event model definition
  invoke an action corresponding to that event according to the action definition.

17. The system of claim 16, wherein the action definition is generation of a second workflow object and transmitting the second workflow object within a second message according to one of a messaging and data layer protocol to one of the first device and a third device, the second workflow object including executable code effective to generate a second interactive interface on the one of the first device and the third device and effective to transmit a second update to the state of the workflow in response to detecting interactions with the second interactive interface.

18. The system of claim 11, wherein receiving the workflow object definition comprises receiving a workflow object chain including an initial workflow object, each workflow object in the workflow object chain following the initial workflow object being invoked by a preceding workflow object in the workflow chain, the first workflow object and the second workflow object being objects in the workflow object chain, each object of the workflow object chain including executable code effective to present a chain object interface and generate chain object updates to the state of the workflow in response to detecting interactions with the chain object interface, the chain object updates including invoking transmission of a subsequent workflow object in the workflow object chain to one of the first device, third device, and another device.

19. The system of claim 11, wherein the workflow object is further programmed to transmit, to the workflow service, the update to the status of the workflow responsive to the interaction with the representation of the workflow object comprises at least one of:

transmitting a text conversation to a third device;
 providing at least one of a date selection and a location selection;
 processing at least one of scheduling and appointment information including identifiers of one or more parties involved;
 updating a task as being completed;
 associating a digital signature with a document;
 associating a digital signature with a transaction;
 adding a response to poll data;
 updating a work estimate;
 updating a checklist;
 storing a survey response;
 storing a form according to received responses;
 storing a payment authorization;
 storing a payment confirmation;
 storing a numeric selection;
 provisioning and initiating one of an audio, video, screen sharing session, and other data channel; and
 obtaining contact information from a directory.

20. The system of claim 11, wherein the messaging protocol is a peer-to-peer data transfer protocol.

* * * * *